United States Patent [19]

Persicke

[11] 3,913,963
[45] Oct. 21, 1975

[54] SHOCK OR ENERGY ABSORBING APPARATUS

[75] Inventor: Günter Persicke, Dartford, England

[73] Assignee: Road Research Limited, Gravesend, England

[22] Filed: Aug. 5, 1974

[21] Appl. No.: 494,999

[30] Foreign Application Priority Data
Aug. 14, 1973 United Kingdom............... 38405/73

[52] U.S. Cl.................. 293/15; 180/105 R; 293/73; 293/85; 293/90; 293/100
[51] Int. Cl.² .................... B60R 19/02; B60R 21/14
[58] Field of Search ............... 293/1, 15, 16, 60, 63, 293/68, 70, 73, 74, 85, 86, 89, 90, 99, 100; 180/92, 103, 105 R, 91

[56] References Cited
UNITED STATES PATENTS

| 1,421,650 | 7/1922 | Wyckoff................................ 293/15 |
| 2,036,560 | 4/1936 | Backus................................. 293/63 X |
| 2,890,076 | 6/1959 | Baechler............................. 293/68 X |
| 3,068,039 | 12/1962 | Barényi............................... 293/63 X |
| 3,789,948 | 2/1974 | Hrebicek ............................ 180/91 |
| 3,840,260 | 10/1974 | Wacker et al. .................. 293/70 X |

FOREIGN PATENTS OR APPLICATIONS
509,038   12/1937   United Kingdom.................. 293/86

Primary Examiner—M. Henson Wood, Jr.
Assistant Examiner—Andres Kashnikow
Attorney, Agent, or Firm—Karl W. Flocks

[57] ABSTRACT

A shock absorbing apparatus for use on heavy load carrying vehicles having a chassis mounted on road wheels comprising a bumper for extending across the width of the vehicle and pivotally mounted on an arm which, at a point remote from the bumper, is pivotally mounted with respect to the chassis, and an energy absorbing device pivotally articulated at spaced points in its length to the arm and with respect to the chassis at a point spaced from the pivotal connection between the arm and the chassis, whereby when the bumper bar is subjected to a force with a momentum in excess of a predetermined value the energy absorbing device will operate to permit movement of the arm to cause displacement of the bumper bar in a direction having a horizontal component.

9 Claims, 5 Drawing Figures

SHOCK OR ENERGY ABSORBING APPARATUS

BACKGROUND OF THE INVENTION

1. Field of the Invention

This invention relates to shock absorbing apparatus for use on heavy load carrying vehicles such as lorries, passenger coaches and buses.

2. Description of the Prior Art

Conventionally such vehicles are provided at the front end and usually at the rear end with bumper bars extending across the width of the vehicle and mounted on the chassis of the vehicle or on members fast with the chassis or vehicle body. Such bumpers have to be at a specific height so that when vehicles are in line one behind the other and one bumps the vehicle in front, these vehicles will first engage bumper to bumper. The regulation bumper height is chosen so that for all road vehicles the bumper is below the top of the bonnet or equivalent part of the front of a vehicle.

Shock absorbers are frequently interposed between the chassis and the bumper bar to absorb the energy of an impact or force on the bar. Such shock absorbers must be capable of not only absorbing the momentum of an impact, but of restoring themselves to their original positions before impact without bouncing back. The distance of the front of the bumper bar in front of the vehicle is critical and selected since if it is too close to the vehicle e.g. 6 inches the deceleration rate is so high that if a pedestrian is struck by the vehicle it could be fatal; it must therefore be far enough in front of the vehicle e.g. 2 feet, to avoid this hazard. To avoid the absorbers bouncing back to their original position after operation, they are usually hydraulic or pneumatic cylinders, or rubber or synthetic plastics materials such as polyethylene or butylene, but not primarily mechanical spring devices.

The main object of the present invention is to provide a shock absorbing apparatus, for use with bumper bars of heavy load carrying vehicles of improved construction and complying with the aforesaid requirements.

SUMMARY

According to the present invention a shock absorbing apparatus for use on heavy load carrying vehicles having a chassis mounted on road wheels, comprises a bumper for extending across the width of the vehicle and pivotally mounted on an arm which, at a point remote from the bumper, is pivotally mounted with respect to the chassis, and an energy absorbing device pivotally articulated at spaced points in its length to the arm and with respect to the chassis at a point spaced from the pivotal connection between the arm and the chassis, whereby when the bumper is subjected to a force with a momentum in excess of a predetermined value the energy absorbing device will operate to permit movement of the arm to cause displacement of the bumper in a direction having a horizontal component.

DESCRIPTION OF PREFERRED CONSTRUCTIONS.

In one preferred construction the arm extends downwardly and forwardly or rearwardly respectively of the front or rear of the vehicle, and the energy absorbing device comprises a compressible device articulated to the chassis and to a mid portion of the arm, whereby when a force with a predetermined momentum meets the bumper, the bumper will swing downwardly on the arm towards the vehicle chassis.

In another construction the bumper is mounted on a pair of spaced substantially horizontal arms pivoted at their rear portions with respect to the chassis, and each energy absorbing device comprises a compressible device articulated between the arm adjacent to the bumper and with respect to the chassis, whereby when the bumper is subjected to said predetermined force the bumper will swing upwardly and rearwardly.

In addition to the bumper being articulated to the vehicle through the energy absorbing device the bumper at its ends may be curved around and extended alongside an end portion of the vehicle where its ends are pivoted to the vehicle to permit the bumper to swing upwardly. Thus if the vehicle strikes a pedestrian the bumper, as the shock absorbers operate to absorb energy, will swing upwardly carrying the pedestrian to prevent him being run over while lying on the road. An apron or net may be slung between the bumper and the vehicle to support a raised pedestrian after he has been lifted by the rising bumper.

Moreover, the shock absorber, when in the form of hydraulic or pneumatic cylinders may be connected into an hydraulic or compressed gas circuit, e.g., air, which includes means responsive to the pressure in the braking system of the vehicle and/or to the accelerator or ignition device of the vehicle engine whereby the operation of the sock absorber will vary as a function of the speed and/or acceleration or deceleration of the vehicle.

DESCRIPTION OF THE PREFERRED EMBODIMENTS

Figure 1:
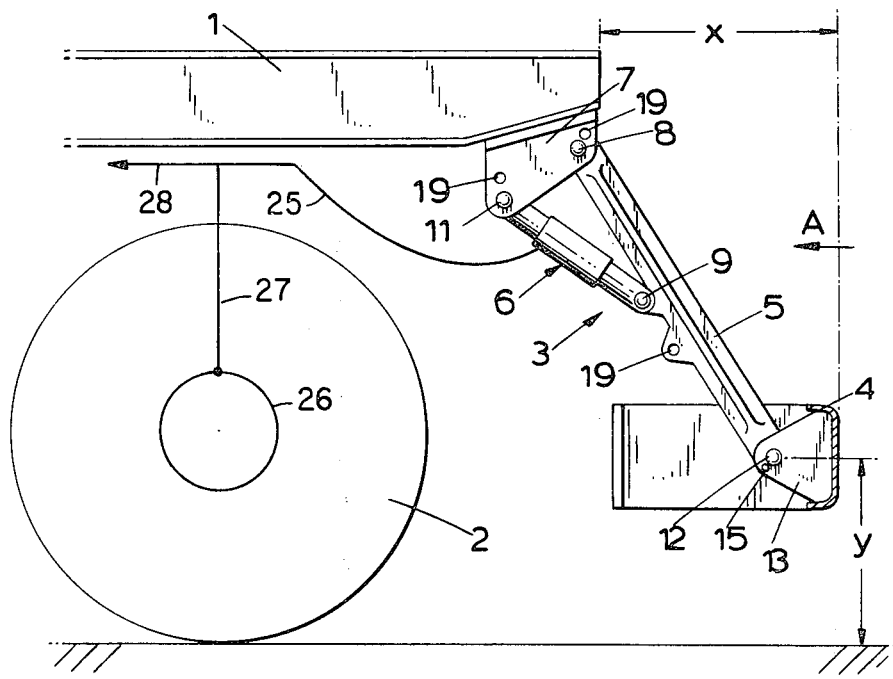
FIG. 1 is a side view of part of a vehicle showing a rear mounted bumper bar.

In the drawings the same references are used to designate the same or similar parts.

Figure 3:
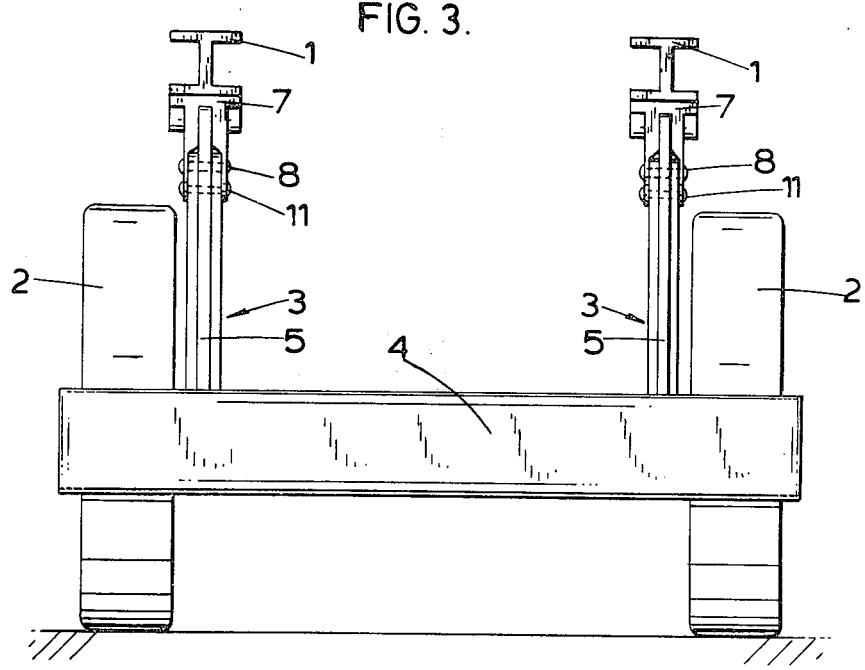
FIG. 3 is a view looking from the right of FIG. 1 looking in the direction of the arrow 'A'.

Referring to FIGS. 1 and 3 these show the chassis of the vehicle, more particularly the longitudinal chassis members 1 and rear road wheel 2 at one side of the vehicle. It will be understood that energy absorbing apparatus indicated generally at 3, although shown as mounted on the chassis members 1, may be mounted on the vehicle body or on a part fast with the body and/or chassis.

The energy absorbing apparatus 3 comprises a bumper shown as a bumper bar 4, an arm 5, and a shock absorber 6, all mounted by a bracket 7 on the chassis member 1, a similar apparatus being provided at the opposite side of the vehicle.

The arm 5 is pivoted at its upper end at 8 to the rear end portion of the bracket 7 and extends downwardly and rearwardly. The shock absorber is shown as an hydraulic cylinder yielding in compression and the cylinder is pivoted to the mid length portion of the arm at 9 and the piston rod 10 at its free end portion is pivoted at 11 to the bracket 7, the point 11 being lower than and in front of the pivot 8. The lower end of the arm 5 has pivoted thereto at 12 a bracket 13 fast with the bumper bar 4; means such as a shear pin 15 and/or a spring is or are interposed between the arms 5 and the bracket 13 to maintain the bumper bar front face normally substantially vertical.

In operation if a following vehicle bumps into the rear of the vehicle in FIG. 1, the two vehicles will first contact at the bumper bar 4 and the shear pin 15, and/or spring if used, will yield so that the bar will swing anti-clockwise in FIG. 1, and the shock absorber will compress so that the arm swings downwardly. As the shock absorber absorbs the momentum of the impact it will arrest the swing of the arm until it comes to a halt. The distance $y$ of the bumper bar is as provided in the road regulations of the authorities and is selected to be below the bonnet or equivalent part of the front of any road vehicle. The distance $x$ between the rear face of the bumper bar and the rearmost part of the vehicle chassis or body is selected to ensure that the momentum of an impact is within the safety provisions laid down by road authorities.

Figure 2:
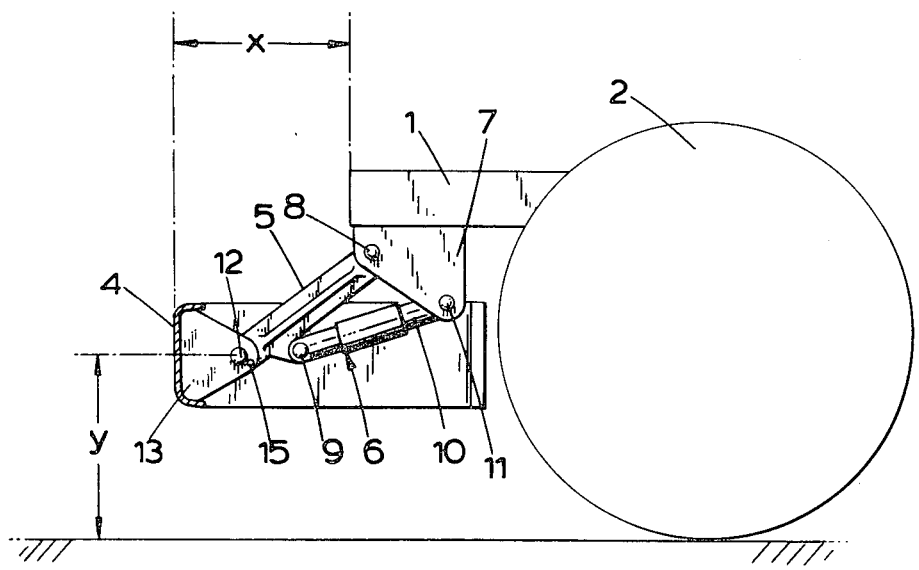
FIG. 2 is a similar side view to FIG. 1 showing a front mounted bumper bar.
Figure 4:
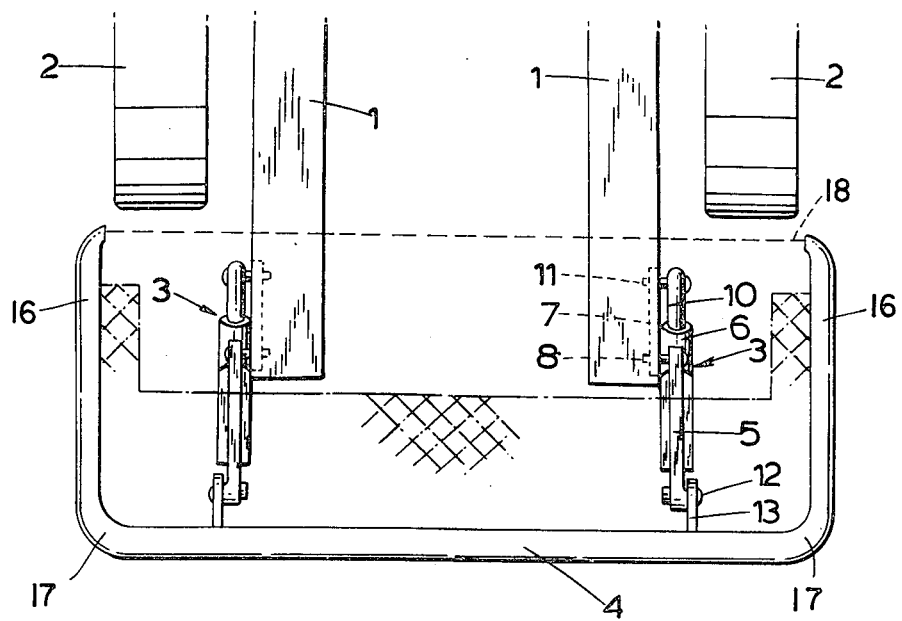
FIG. 4 is a plan view of FIG. 2 showing an apron for receiving a pedestrian; and, FIG. 5 is a view similar to FIG. 2 of an alternative construction.

Referring to FIGS. 2 and 4, these show a shock absorbing apparatus similar to FIGS. 1 and 3 but mounted on the front of a vehicle. In FIGS. 2 and 4, the same references as used in FIGS. 1 and 3 can be recognized. The operation is similar to that described with reference to FIGS. 1 and 3 except that the disposition of the arm 5 is inclined at a smaller angle to the horizontal and hence the bumper bar will swing downwardly a less distance than in the rear bumper construction of FIGS. 1 and 3.

As seen in FIG. 4 but omitted from FIG. 2 for clarity the bumper bar is bent rearwardly at its ends into two longitudinal elements 16, the angle and shape of the bends 17 being critical and as laid down by road authorities, but since it forms no part of the present invention it will not be further described.

The rear end portions of the elements 16 are articulated as indicated by the chain-dot line 18 to the vehicle body or chassis or a part fast therewith which enable the bumper bar to swing upwardly on impact thus raising a pedestrian, for example who has been struck by the vehicle, off the road to prevent him being run over by the vehicle before it comes to a halt. The pivots 8, 9, 11 and 18 or any of them may include lost motion means such as pins riding in slots to ensure smooth operation of the whole shock absorbing apparatus as the shock absorber 6 compresses to absorb the energy or momentum of the impact.

The length of the arm 5 or the pressure in the shock absorber may be adjustable to suit the design and intended function of the vehicle. The disposition of the pivot points may also be variable as by having additional bearing holes 19 on some or all of the parts for such adjustments.

The bumper bar may have an apron or net 20 attached to it which extends up to the front of the vehicle which it is attached to form means to receive anything or a pedestrian struck by the vehicle.

Figure 5:
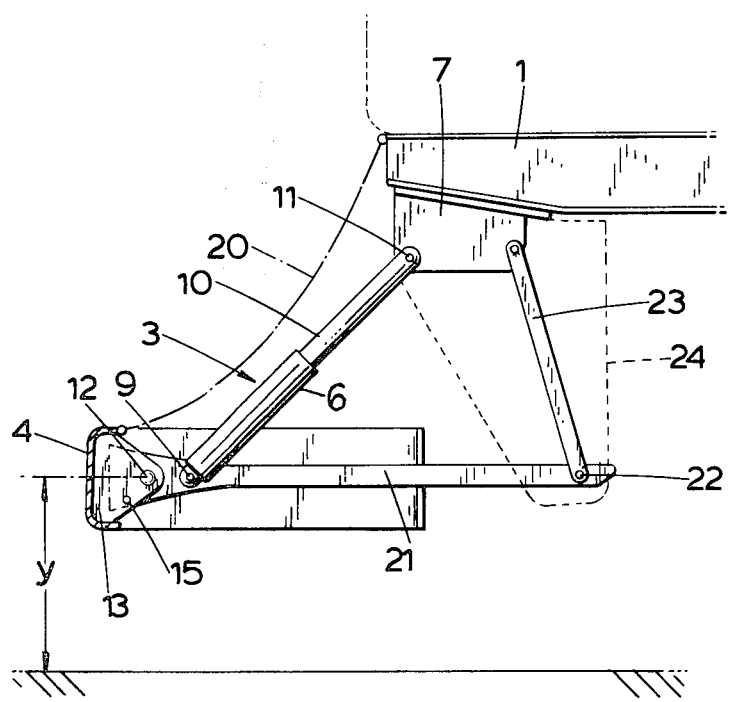

Referring to FIG. 5 this shows an alternative construction for a front vehicle bumper bar and shock absorber; the same references are used as in FIGS. 1 to 4 for similar parts.

The arm 5 however of FIGS. 1 to 4 is replaced by an arm 21 which is substantially horizontal and its rear end is pivoted at 22 to the lower end of an arm 23 fixed to the bracket 7 so as not to rotate. Alternatively the arm 23 may be replaced by extending the braket 7 downwards as indicated in dotted lines 24 in FIG. 5.

In operation, if the vehicle strikes a person the shear pin, and/or spring if used, will not yield but the shock absorber may yield so that the person is lifted onto the apron or net 20. In the impact of the vehicle against another vehicle or object, the pin 15 will yield as with the shock absorber so that the arm 21 will swing upwardly. The shock absorber may be constructed and mounted as described with reference to FIGS. 1 and 3 or FIGS. 2 and 4.

The bumper is described in the preferred embodiments as a bumper bar but it will be understood that it may be in the form of two or more members disposed across the end of the vehicle.

The shock absorbing device may be of any suitable form such as described in the specification of United Kingdom Pat. Nos. 1,319,446, 1,013,152, and 1,236,744. Alternatively the shock absorber devices may be blocks of rubber synthetic plastics materials, e.g. butylene or polyethylene, or any material or construction, device or apparatus which will yield as required in operation as described herein and which will be shown to restore itself or return to its original position and will not bounce back. The aforesaid shock absorber devices may incorporate springs but the action of the spring must not predominate if it is to cause rapid bounce back after impact. While the hydraulic or pneumatic shock absorber devices are described as compressible they may equally be constructed to operate in tension to absorb the momentum of an impact on the bumper bar.

It is desirable that when the vehicle is travelling at different speeds, the operation of the shock absorber may be varied. For this purpose the hydraulic or pneumatic pressure within the shock absorber cylinder may be in a pressure fluid circuit 25 which is responsive in any known manner to the vehicle braking system 26 through line 27 and/or the speed regulator e.g. the accelerator or the ignition device of the vehicle prime mover through line 28, and may if desired function to cut off the fuel supply to a prime mover such as an internal combustion engine or cut out the engine ignition, or to vary or switch off the electric current supply to an electric motor type of prime mover.

The shock absorbing of the invention may be applicable to trailer vehicles as well as to self propelled vehicles, and with trailers the shock absorbers may be connected by conduits to the speed control mechanism of the towing vehicle.

The apparatus of the invention may be applied to rail vehicles be they self propelled or towed and they may replace or augment the conventional buffers on rail vehicles.

I claim:

1. A shock absorbing apparatus for use on heavy load carrying vehicles having a chassis mounted on road wheels, said apparatus comprising a bumper extending across the width of the vehicle, an arm pivotally mountable with respect to the vehicle, said bumper being pivotally mounted on the end of said arm remote from said pivotal connection of said arm with respect to said vehicle, and an energy absorbing device pivotally articulated at spaced points in its length to said arm and with respect to said chassis at a point spaced from said pivotal connection between said arm and said chassis, said energy absorbing device being operable in response to a force with a momentum in excess of a predetermined value to permit movement of said arm to cause displacement of said bumper in a direction having a horizontal component.

2. A shock absorbing apparatus according to claim 1 wherein said arm extends downwardly away from the end portion of said vehicle and said energy absorbing device comprises a compressible device articulated to said chassis and to a mid portion of said arm to permit said bumper to move downwardly towards said vehicle on impact.

3. A shock absorbing apparatus according to claim 1 wherein said bumper is mounted on a pair of spaced substantially horizontal arms pivoted at their other end portions with respect to said chassis to permit said bumper to swing upwardly towards said vehicle on impact.

4. A shock absorbing apparatus according to claim 1 wherein said bumper at its ends is curved round and extended alongside an end portion of said vehicle where said bumper end portions are pivoted to said chassis to permit said bumper to swing upwardly.

5. A shock absorbing apparatus according to claim 1 wherein a device selected from an apron and a net is slung between said bumper and said vehicle.

6. A heavy load carrying vehicle comprising a chassis mounted on road wheels, a bumper extending across the width of said vehicle, an arm pivotally mounted with respect to said vehicle, said bumper being pivotally mounted on the end of said arm remote from said pivotal connection of said arm with respect to said vehicle, and an energy absorbing device pivotally articulated at spaced points in its length to said arm and with respect to said chassis at a point spaced from said pivotal connection between said arm and said chassis, said energy absorbing device being operable in response to a force with a momentum in excess of a predetermined value to permit movement of said arm for displacement of said bumper in a direction having a horizontal component.

7. A heavy load carrying vehicle according to claim 6 wherein said energy absorbing device includes at least one pressure fluid cylinder connected to a pressure fluid circuit which includes means responsive to a fluid operated braking system of said vehicle, whereby the operation of the energy absorbing device will vary as a function of the speed of the vehicle.

8. A heavy load carrying vehicle according to claim 6 wherein said energy absorbing device includes at least one pressure fluid cylinder connected to a pressure fluid circuit which includes means responsive to the accelerator of the prime mover of said vehicle, whereby the operation of the energy absorbing device will vary as a function of the speed of the vehicle.

9. A heavy load carrying vehicle according to claim 6 wherein said energy absorbing device includes at least one pressure fluid cylinder connected to a pressure fluid circuit which includes means responsive to the ignition device of the prime mover of said vehicle, whereby the operation of the energy absorbing device will vary as a function of the speed of the vehicle.

* * * * *